Aug. 10, 1948.  F. A. JONES  2,446,877
EQUALIZING SPRING SUSPENSION FOR
TANDEM AXLE VEHICLES
Filed April 21, 1945  2 Sheets-Sheet 1
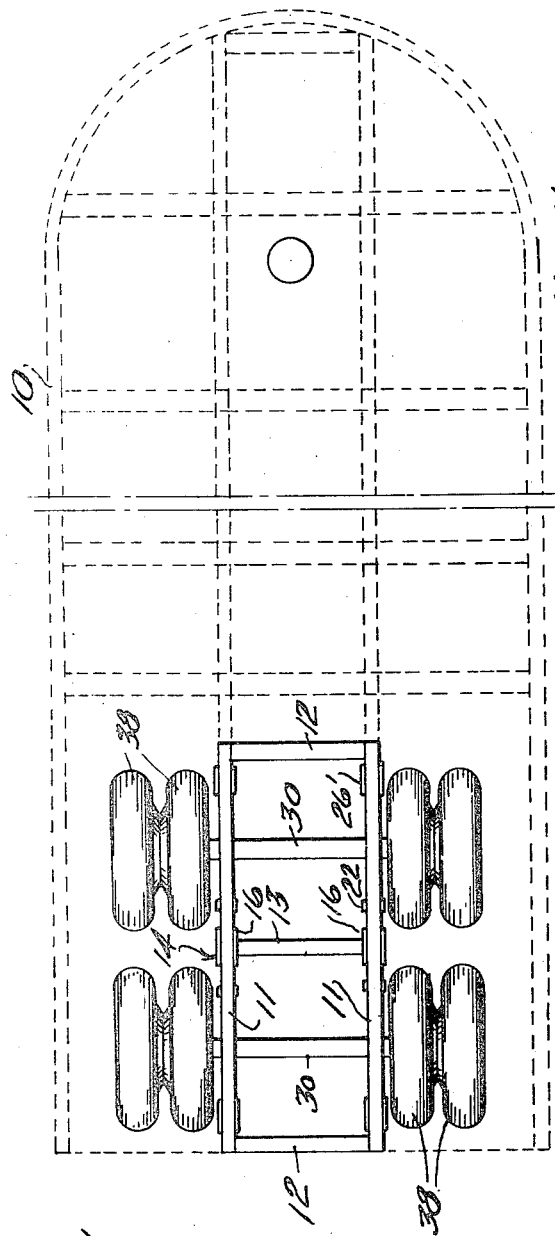
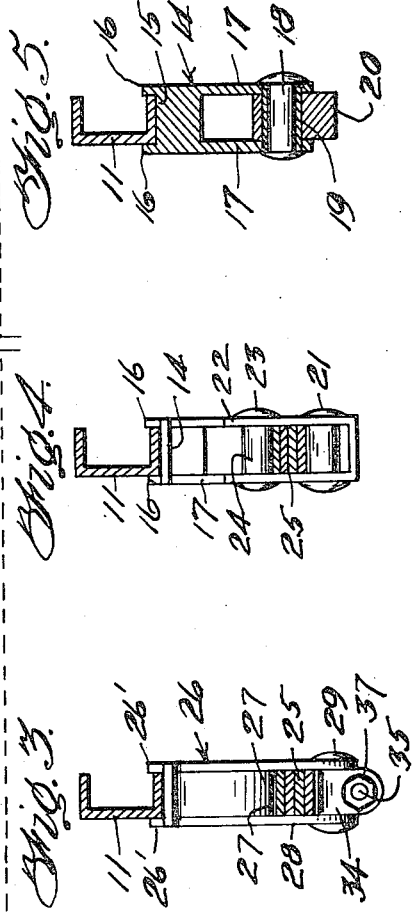
Inventor
Frank A. Jones
By Ralph J. Bassett
Attorney

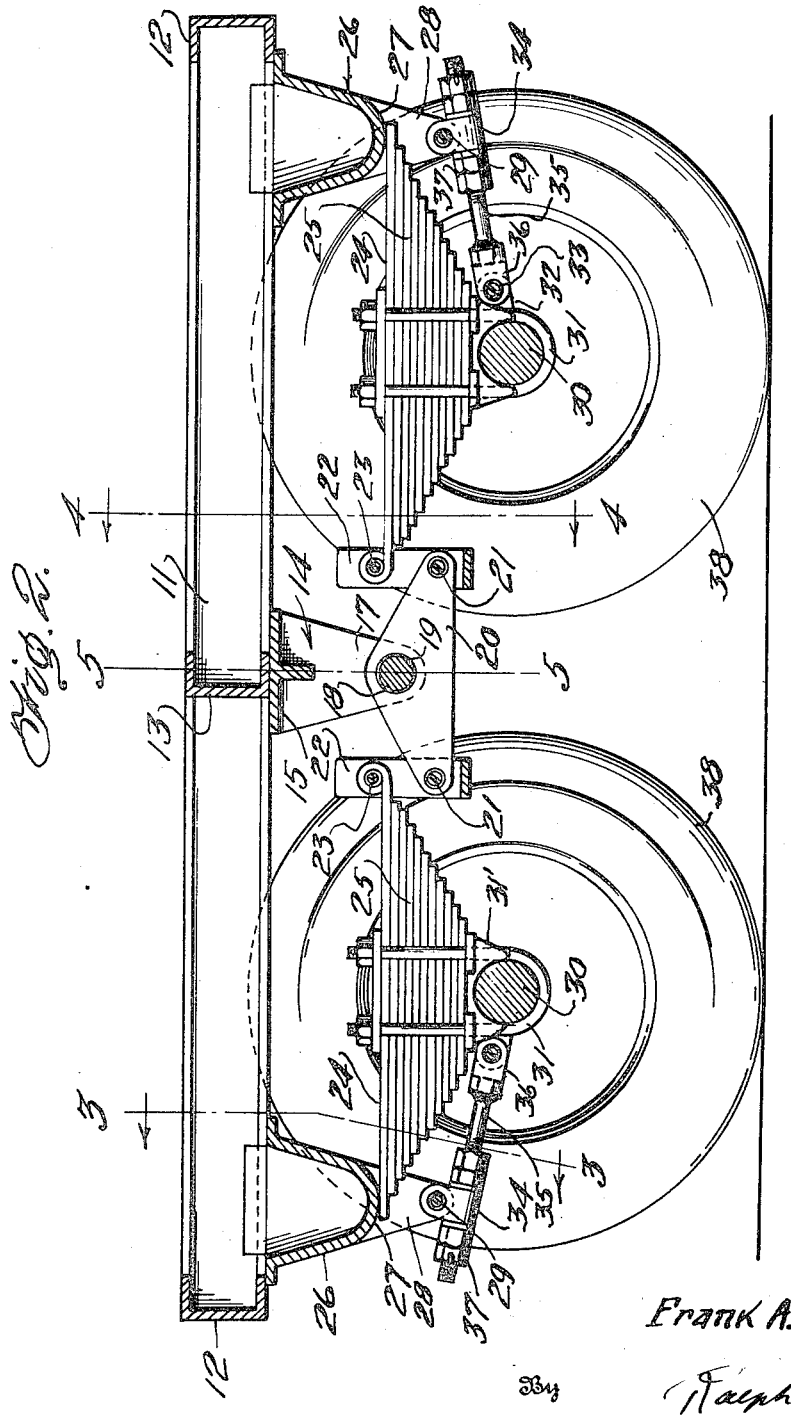

Patented Aug. 10, 1948

2,446,877

UNITED STATES PATENT OFFICE 2,446,877

EQUALIZING SPRING SUSPENSION FOR TANDEM AXLE VEHICLES

Frank Alfred Jones, Bristol, Tenn., assignor to Harry M. Daniel, Bristol, Va.

Application April 21, 1945, Serial No. 589,503

2 Claims. (Cl. 280—104.5)

This invention relates to a spring suspension for vehicles and especially for vehicles of the trailer type wherein the greatest weight is borne at the rear of the vehicle and consequently requires heavy support.

Furthermore the invention relates to a spring suspension for use in such vehicles as require for the rear support a pair of parallel axles usually termed tandem axles.

The main object of this invention is to provide means in the form of adjustable radius rods, for independently maintaining the individual axles in proper transverse alinement to the direction of travel of the vehicle, the radius rods moving toward a horizontal plane under increase in load, and extending forwardly and rearwardly in pairs at each end of the spring suspension.

It is also an object of this invention to provide a spring suspension for each of the parallel axles so that while the spring mounting for each axle is capable of independent movement, at the same time part of this movement is distributed, whereby, due to the radius rod arrangement, both axles are more positively positioned in their proper predetermined relative alinement upon increase of spring movement due to load or road conditions.

One important object of the invention is to provide a support of this character wherein the spring suspension on the two axles will be equalized by means of interconnecting means mounted on the vehicle frame.

Another important object of the invention is to provide a device of this character wherein the axles will be restrained from movement from and toward each other while being free to rise and fall independently, thus preventing misalinement of the tire and preventing unnecessary and uneven wear.

A further object of the invention is to provide a construction whereby such independently movable axles will at all times equally support the load of the vehicle.

With the above and other objects in view, the invention consists in general of certain novel details of construction and combinations of parts hereinafter fully described, illustrated in the accompanying drawings and particularly claimed.

In the accompanying drawings, like characters of reference indicate like parts in the several views and:

Figure 1 is a plan view shown in broken lines of a trailer vehicle and also disclosing the present invention in full lines at the rear of such vehicle;

Fig. 2 is a side elevation partly in section of the suspension means at the rear of the vehicle;

Fig. 3 is a section on the line 3—3 of Fig. 2;

Fig. 4 is a section on the line 4—4 of Fig. 2; and

Fig. 5 is a section on the line 5—5 of Fig. 2, the sections on Fig. 2 showing only one-half of the spring suspension and the other half being merely a duplicate thereof.

In the present invention there is indicated in general a trailer body 10. This particular trailer body may be of any desired form and construction and forms no essential part of the present invention. However the suspension means for the rear end of this trailer consists of a rectangular frame having longitudinally extending members 11 here disclosed as being of channel iron although the invention is not restricted to any particular character of structural member. These members are joined at the front and rear ends by cross members 12 also of any preferred structural form. There is thus made a rectangular frame and centrally of this frame there is a further cross member 13 to securely brace the central portions of the members 11. Under each member 11 at the center thereof is a hanger 14 having a base 15 resting on the under sides of the members 11 and also having lips 16 which embrace the lower part of the respective member 11 as clearly shown in Fig. 5. This member also has a pair of depending legs 17 where-through passes a pin 18 surrounded by an anti-friction bushing 19. Between the legs 17 and on the bushing 19 is mounted an equalizing lever 20. Through each end of the lever 20 passes a pin 21 which also extends through the sides of a U-shaped shackle 22 which extends upwardly from the pin 21. Adjacent the upper ends of these shackles is a pin 23 which is engaged by the major leaf 24 of a spring indicated in general as at 25 and having a multiple series of reducingly graduated leaves below the leaf 23. At each end of each member 11 is mounted, beneath the member, a stool 26. This stool is supported underneath the respective member 11 as shown in Fig. 3 and has lips 26' embracing the sides of said member. The body of the stool is rounded at the lower end as shown at 27 and below this the sides of the stool project downwardly as at 28. Through these sides extends a pin 29.

It will be seen from this structure that the inner adjacent ends of each spring 24—25 is hingedly fixed to the equalizing bar or lever 20 by the shackle pins 21 so that the motion of one spring, due to its axle movement, is transmitted to the companion spring to distribute the load to the entire suspension.

At 30 is shown a transverse axle, there being one of these axles in front and the other behind the equalizing lever. The spring leaves are secured to these axles by means of yokes or U-bolts 31 in the usual manner, i. e., by means of the saddle 31' which saddle has an under face conforming to the axle contour and a flat upper face upon which the lower spring leaf rests. The saddle is welded to the axle in the usual manner. The U-bolts 31 are inserted upwardly through the saddle casting at each side of the spring, enclosing the axle at their closed end. The upper threaded end portions of the U-bolts extend through the spring clamp plate 31'' and the spring plate is seated by nuts threaded onto the threaded bolt extremities. Each saddle is formed with a projecting ear 32 having a horizontal transverse opening through which the bolt or pin 33 extends and upon which pin is pivotally mounted the adjacent head 36 of the associated radius rod 35. To adjustably support the outer end of each radius rod there is pivotally supported a yoke 34, depending from the pin 29 carried by the hanger or stool 26. The radius rod is threaded and provided with nuts 37 on opposite sides of the yoke 34 so that its length, in relation to the pin 33, may be adjusted as desired. The axles 30 carry the usual wheels 38.

Now in operation it will be noted that this device eliminates all necessity for shackles except at those ends of the two spring members on each side which connect with the equalizing lever. Also it will be noted that by reason of the provision of the radius rods the axles 30 are free to move in relation to the supporting frame for the vehicle, that is to say these parts have free vertical movement relative to each other. Now under this construction we may suppose that the vehicle passes over an obstruction in the rod so that the forward axle rises with respect to the remainder of the vehicle. Nevertheless when this occurs the forward spring will of course tend to rise at both ends but since the forward end of the forward spring is held underneath the stool 25 it is only the rear end of such spring that can rise or is so stressed that it tends to rise. Assuming that the stress applied with this spring is not sufficient to make a complete flexion the result will be that the equalizer lever 20 will transmit upward tendency of the rear end of the forward spring to the front end by the rearward spring. Both springs then will be equally stressed and this is the case under any conditions of road traffic. Furthermore the radius rods maintain the axles and the central portions of the spring in such position that positive equalizing of stresses on the two springs always occurs.

While the present development is primarily intended as a tandem axle spring assembly for vans of the trailer type, nevertheless the same theory of operation and teaching may be applied to other commercial vehicles in which increased load carrying capacity is desirable. It will be apparent that positive alinement of both axles may be secured by proper adjustment of the radius rods and this alinement is maintained under all road and load conditions. The result is that by eliminating any possibility of misalinement of the tandem axles, a substantial increase in the tire life is expected and procured and better tracking is inherently present. It will be noted that the hangers for the springs are so constructed and arranged that the springs are supported directly under the frame thus cancelling the usual overturning moments on the frame as in instances where the spring hangers are attached so that the spring is outside the frame. Moreover the radius rods are so positioned that their pull is substantially from the axle center lines, thus all towing and braking strains are transmitted directly from the axle to the hanger and thus to the frame. It is also desirable that the shackles be in tension to eliminate the normal tendency of the bushings to cock and thereby create an unnecessary wear on the shackle parts. Either bronze or rubber bushing may be utilized.

What is claimed is:

1. In a twin axle truck, a frame having a pair of spaced side bars, a pair of wheel carrying axles spaced in parallelism across said frame, hangers fixed to the side bars and depending therefrom, said hangers being arranged intermediate said axles and supporting a pair of pivoted equalizing levers, leaf springs arranged in pairs at each end of said axles, shackle members including shackle pins and bushings connecting the proximal ends of said springs to said equalizing levers, said shackle members being in tension to maintain the same against angular distortion during relative pivotal movement of the parts, downwardly extending spring stop means fixed to said frame immediately above the free ends of said springs to limit their upward movement, and radius rods pivotally supported by said stop means and to the adjacent axles, said radius rods being movable toward a horizontal plane intersecting said axles upon increase in load conditions and normally lying in a plane intersecting the plane of the axle axis.

2. In a twin axle truck, a pair of parallel axles arranged in tandem, each axle having a leaf spring assembly supported intermediate its ends on a fixed saddle, an equalizing lever pivotally suspended from the truck intermediate said springs, shackle members pivotally connected to each end of the equalizing lever, said shackle members being connected to the adjacent ends of said springs, the outer ends of said spring being free for load deflection, stop means for limiting the upward movement of the free end of each spring, said stop means comprising depending stool members fixed to said truck and having a rounded lower bearing portion normally seating on the upper face of the free end portion of each of said springs to limit its upward movement and permit longitudinal movement under load deflection, each of said stool members including spaced side wall portions extending below said bearing portion, transverse pin members connecting the side wall of each stool, and radius rods for each axle, said radius rods each having one end pivotally connected to one of said transversal pin members and its other end pivotally connected to an axle, and being arranged for movement to a horizontal plane intersecting the axis of the axle under load conditions of the truck, and normally lying in a plane intersecting the axle axis.

FRANK ALFRED JONES.

REFERENCES CITED

The following references are of record in the file of this patent:

UNITED STATES PATENTS

| Number | Name | Date |
|---|---|---|
| 1,667,275 | Warhus | Apr. 24, 1928 |
| 1,705,137 | Rayburn et al. | Mar. 12, 1929 |
| 2,108,323 | Weiss | Feb. 15, 1938 |
| 2,204,087 | Konetsky | June 11, 1940 |
| 2,312,253 | Konetsky | Feb. 23, 1943 |

FOREIGN PATENTS

| Number | Country | Date |
|---|---|---|
| 432,422 | Great Britain | July 25, 1935 |